(12) United States Patent
Martinez

(10) Patent No.: US 6,402,258 B1
(45) Date of Patent: Jun. 11, 2002

(54) VEHICLE WHEEL ATTACHMENT SYSTEM

(76) Inventor: Augusto H. Martinez, 920 Ouellette Avenue #717, Windsor, Ontario (CA), N9A 1C8

( * ) Notice: Subject to any disclaimer, the term of this patent is extended or adjusted under 35 U.S.C. 154(b) by 0 days.

(21) Appl. No.: 09/519,764

(22) Filed: Mar. 6, 2000

(51) Int. Cl.[7] .......................... B60B 23/00; B60B 27/02; B60B 37/00; F16D 3/80; F16L 17/00
(52) U.S. Cl. ................. 301/111.04; 301/105.1; 301/111.03; 403/31
(58) Field of Search .............................. 301/105.1, 111, 301/112, 115, 118, 122, 111.03, 111.04, 111.07; 403/31, 348

(56) References Cited

U.S. PATENT DOCUMENTS

| 4,804,027 A | 2/1989 | Runels |
|---|---|---|
| 5,097,702 A | 3/1992 | Nantua et al. |
| 5,129,741 A | 7/1992 | Deane |
| 5,353,890 A | 10/1994 | Clohessy |
| 5,413,201 A | 5/1995 | Vidal |
| 5,431,485 A | 7/1995 | Hayashi |

*Primary Examiner*—S. Joseph Morano
*Assistant Examiner*—Jason R. Bellinger

(57) ABSTRACT

A vehicle wheel attachment system for facilitating hydraulic coupling of a vehicle wheel to a vehicle includes a hub assembly having a piston hydraulically coupled to a plunger assembly. The hub assembly is passed through a wheel and attached to a rotor. The hub assembly is pressurized to extend the plunger assembly to clamp the wheel between the hub assembly and the rotor. In an embodiment, the plunger assembly is utilized hydraulically without the piston.

20 Claims, 3 Drawing Sheets

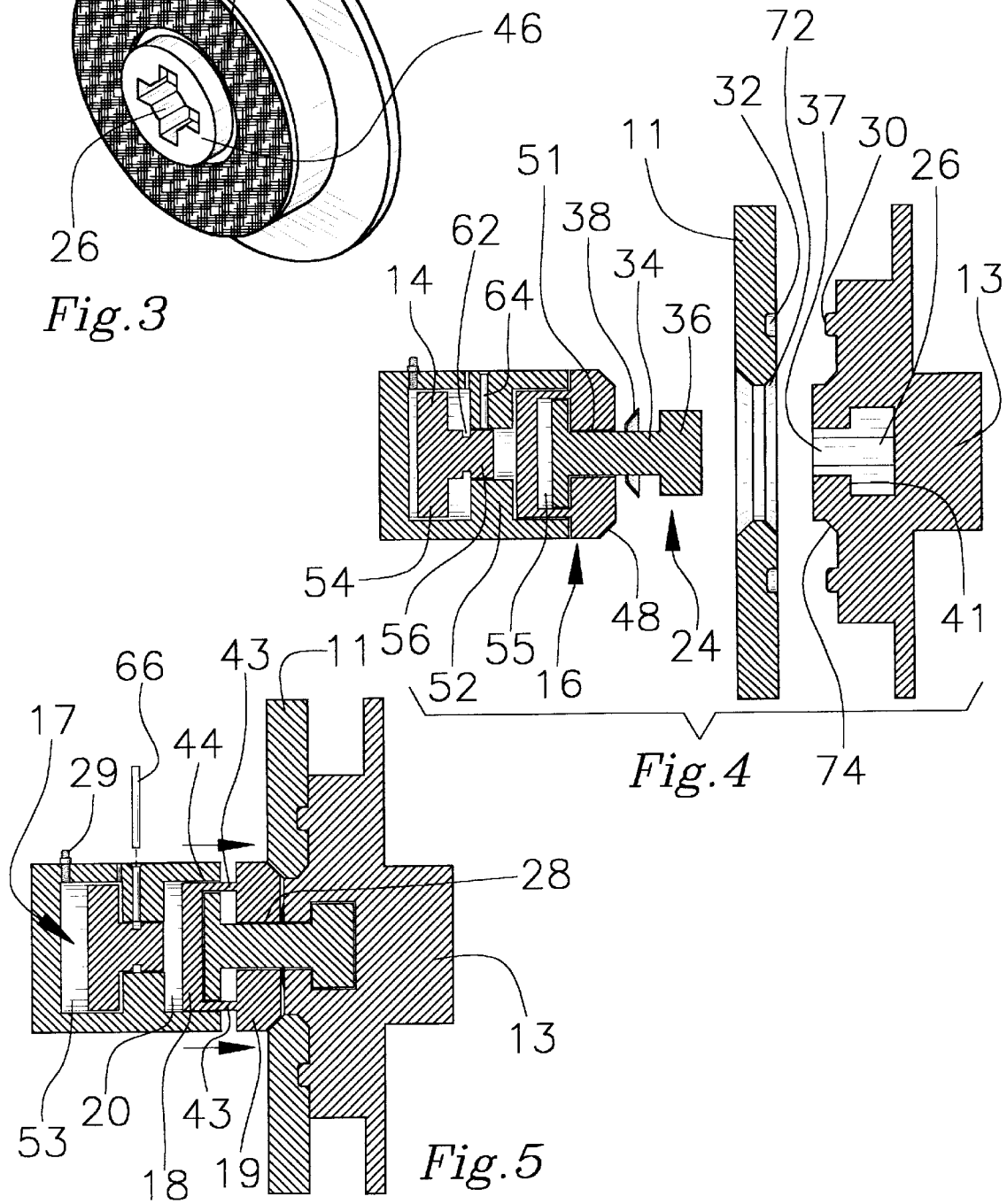

150# VEHICLE WHEEL ATTACHMENT SYSTEM

BACKGROUND OF THE INVENTION

1. Field of the Invention

The present invention relates to vehicle wheel attachment devices and more particularly pertains to a new vehicle wheel attachment system for facilitating hydraulic coupling of a vehicle wheel to a vehicle.

2. Description of the Prior Art

The use of vehicle wheel attachment devices is known in the prior art. More specifically, vehicle wheel attachment devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,413,201; 5,431,485; 5,353,890; 5,097,702; 5,129,741; and 4,804,027.

While these devices fulfill their respective, particular objectives and requirements, the aforementioned patents do not disclose a new vehicle wheel attachment system. The inventive device includes a hub assembly having a piston hydraulically coupled to a plunger assembly. The hub assembly is passed through a wheel and attached to a rotor. The hub assembly is pressurized to extend the plunger assembly to clamp the wheel between the hub assembly and the rotor.

In these respects, the vehicle wheel attachment system according to the present invention substantially departs from the conventional concepts and designs of the prior art, and in so doing provides an apparatus primarily developed for the purpose of facilitating hydraulic coupling of a vehicle wheel to a vehicle.

SUMMARY OF THE INVENTION

In view of the foregoing disadvantages inherent in the known types of vehicle wheel attachment devices now present in the prior art, the present invention provides a new vehicle wheel attachment system construction wherein the same can be utilized for facilitating hydraulic coupling of a vehicle wheel to a vehicle.

The general purpose of the present invention, which will be described subsequently in greater detail, is to provide a new vehicle wheel attachment system apparatus and method which has many of the advantages of the vehicle wheel attachment devices mentioned heretofore and many novel features that result in a new vehicle wheel attachment system which is not anticipated, rendered obvious, suggested, or even implied by any of the prior art vehicle wheel attachment devices, either alone or in any combination thereof.

To attain this, the present invention generally comprises a hub assembly having a piston hydraulically coupled to a plunger assembly. The hub assembly is passed through a wheel and attached to a rotor. The hub assembly is pressurized to extend the plunger assembly to clamp the wheel between the hub assembly and the rotor.

It is another object of the present invention to provide a new vehicle wheel attachment system that may be easily and efficiently manufactured and marketed.

It is a further object of the present invention to provide a new vehicle wheel attachment system that is of a durable and reliable construction.

An even further object of the present invention is to provide a new vehicle wheel attachment system which is susceptible of a low cost of manufacture with regard to both materials and labor, and which accordingly is then susceptible of low prices of sale to the consuming public, thereby making such vehicle wheel attachment system economically available to the buying public.

Still another object of the present invention is to provide a new vehicle wheel attachment system for facilitating hydraulic coupling of a vehicle wheel to a vehicle.

Yet another object of the present invention is to provide a new vehicle wheel attachment system which includes a hub assembly having a piston hydraulically coupled to a plunger assembly. The hub assembly is passed through a wheel and attached to a rotor. The hub assembly is pressurized to extend the plunger assembly to clamp the wheel between the hub assembly and the rotor.

Still yet another object of the present invention is to provide a new vehicle wheel attachment system that facilitates changing a flat tire.

Even still another object of the present invention is to provide a new vehicle wheel attachment system that provides strong, quick, and easily achieved attachment of a vehicle wheel to a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of an embodiment of the rotor of the present invention.

FIG. 4 is a cross-sectional view of the invention taken along line 4—4 of FIG. 2.

FIG. 5 is a cross-sectional view of the invention taken along line 5—5 of FIG. 1.

DESCRIPTION OF THE PREFERRED EMBODIMENT

Figure 1:
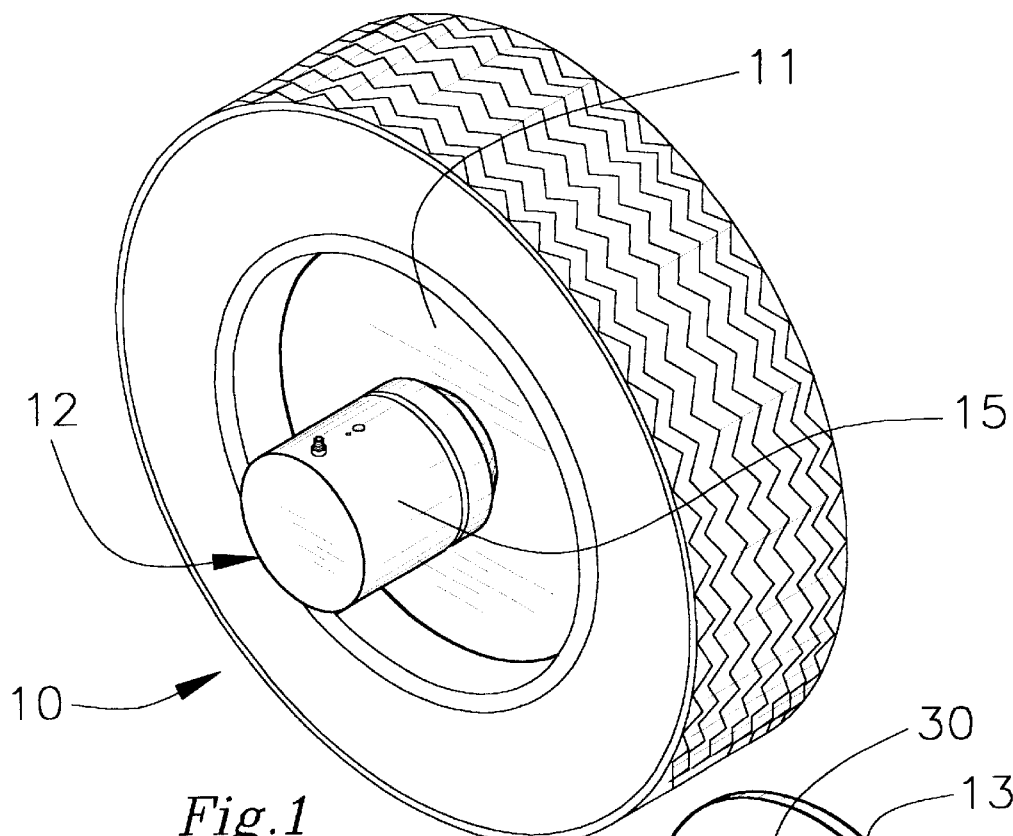
FIG. 1 is a perspective view of a new vehicle wheel attachment system according to the present invention.
Figure 2:
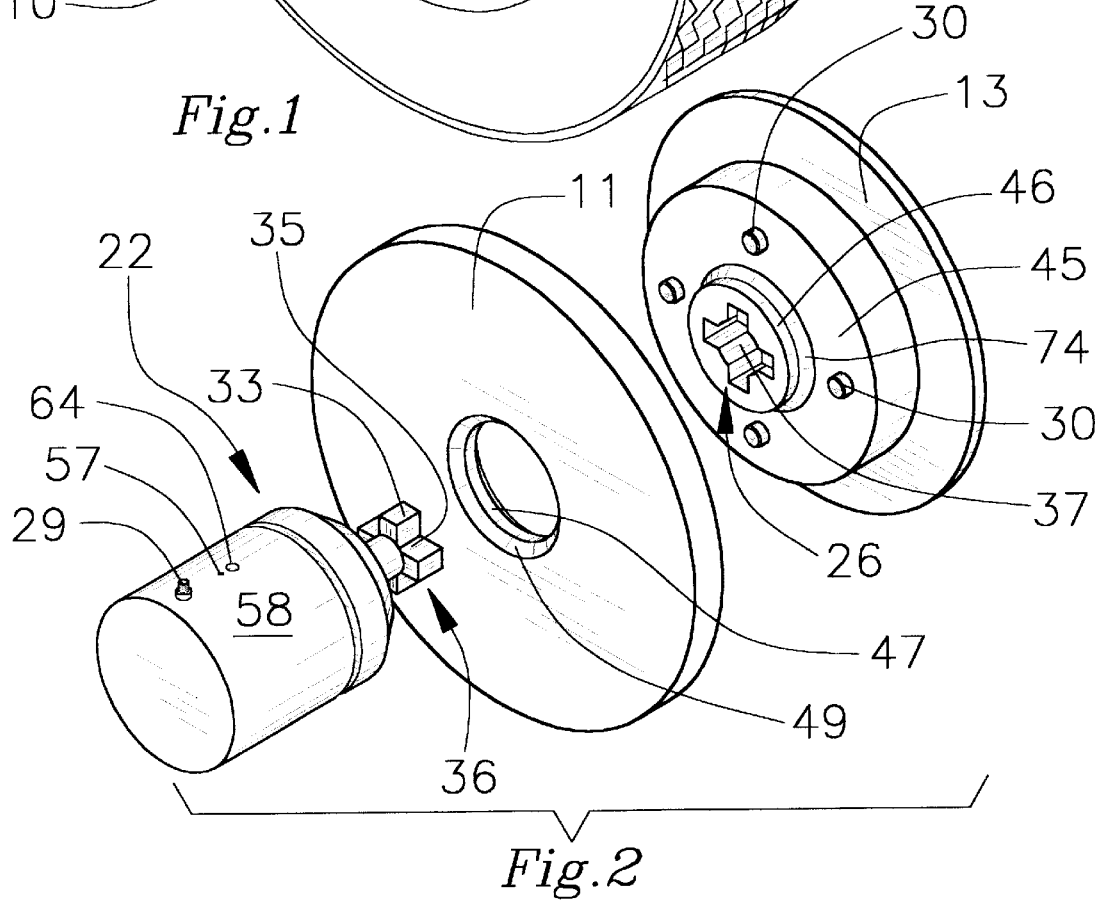
FIG. 2 is a exploded view of the present invention.

With reference now to the drawings, and in particular to FIGS. 1 through 7 thereof, a new vehicle wheel attachment system embodying the principles and concepts of the present invention and generally designated by the reference numeral 10 will be described.

As best illustrated in FIGS. 1 through 7, the vehicle wheel attachment system 10 generally comprises a hub assembly 12, a rotor 13, and a wheel 11. She hub assembly is passed through the wheel and hydraulically attaches to the rotor to clamp the wheel between the hub assembly and the rotor.

The hub assembly includes a hub 15 having an interior space 17. A piston 14 is positioned within the interior space of the hub.

A hydraulic plunger assembly 16 includes an interior portion 18 positioned in the interior space and a head portion 19 extending outwardly from the hub. A hydraulic fluid 20 is positioned in the interior space between the piston and the hydraulic plunger assembly such that movement of the piston moves the hydraulic plunger assembly.

The hub assembly includes a main portion 22 and an attachment portion 24 with the attachment portion extending outwardly from the main portion.

The rotor includes a receiving portion 26. The attachment portion of the hub is insertable into the receiving portion of the rotor for coupling the hub to the rotor. The wheel includes a central aperture 28. The attachment portion 24 is insertable through the aperture 28 such that the wheel is positioned between the hub and the rotor.

A valve 29 is included in the hub assembly for pressurizing the interior space of the hub proximate the piston whereby the piston urges the head portion of the plunger assembly outwardly from the hub to abut the wheel whereby the wheel is engaged to the rotor.

In an embodiment, the rotor includes a plurality of spaced detents 30 extending outwardly from the rotor and the wheel includes a plurality of spaced indents 32. Each indent 32 is positioned for receiving an associated one of the spaced detents 30 when the wheel is engaged to the rotor. Thus, the wheel is fixedly coupled relative to the rotor such that the wheel rotates with the rotor. In an embodiment, a disc of frictional material 68 is bonded to an exterior face 45 of the rotor for the same purpose as use of the indents and detents.

The attachment portion 24 includes a medial cylindrical portion 34 and a distal bracket portion 36. A spring cone washer 38 is attached coaxially to the medial cylindrical portion of the attachment portion such that the cone washer is positioned between the head portion of the plunger and the rotor when the wheel is engaged to the rotor. The cone washer serves to pushes the hub outwardly from the rotor upon depressurization proximate the piston to facilitate removal of the hub from the rotor and thus facilitate removal of the wheel.

The bracket portion includes a plurality of arms 33 extending outwardly from a central portion 35 of the bracket portion. The receiving portion has a neck portion 37 of complimentary configuration to the bracket portion whereby the bracket portion is insertable into the receiving portion through the neck portion 37.

The bracket portion is rotatable within the receiving portion such that the arms abut an interior face 41 of the rotor to prevent disengagement of the hub from the rotor.

A plurality of extension arms 43 extend between and couple together the interior portion of the plunger assembly and the head portion of the plunger assembly. Each of the extension arms extends through an associated slot 44 in the hub.

The rotor includes a disc portion 46 extending outwardly from the exterior face 45 of the rotor. The head portion of the plunger assembly includes a beveled outer perimeter edge 48. Correspondingly, the aperture in the wheel includes a cylindrical first portion 47 for snugly receiving the disc portion of the rotor and an angled second portion 49 extending from the first portion for snugly receiving the beveled outer perimeter edge of the head portion to facilitate firm engagement of the wheel to the rotor. The aperture in the wheel further includes an angled third portion 72 extending from the first portion opposite the angled second portion. The angled third portion 72 is designed for abutting an angled flat surface 74 extending between the disc portion and the exterior face of the rotor.

The head portion of the plunger assembly includes a central aperture 51 and the attachment portion of the hub passes through the central aperture in the head portion of the plunger assembly such that the attachment portion of the hub and the plunger assembly are positioned coaxially with respect to each other.

The interior space of the hub includes a medial throat portion 52 for defining a first chamber 53 and a second chamber 55 in the interior space.

The piston has a cylinder 54 and a rod 56 extending outwardly from the cylinder. The cylinder is positioned in the first chamber and the rod extends into the throat portion of the interior space to provide enhanced pressure to the hydraulic fluid for acting on the plunger assembly.

To permit movement of the piston within the first chamber, the hub includes an air vent 57 extending between an outer surface 58 of the hub and the first chamber of the interior space proximate the rod.

In an embodiment, the rod includes a locking groove 62 extending around the rod perpendicular to a longitudinal axis of the rod. The hub includes a locking channel 64 extending between the throat portion and the exterior surface of the hub. The locking channel is aligned with the locking groove when the interior space is pressurized proximate the piston to extend the plunger assembly such that the hub couples the wheel to the rotor. A locking member 66 is insertable through the locking channel to engage the locking groove such that the piston is prevented from moving relative to the hub for preventing disengagement of the wheel from the rotor upon loss of pressure on the piston.

Figure 6:
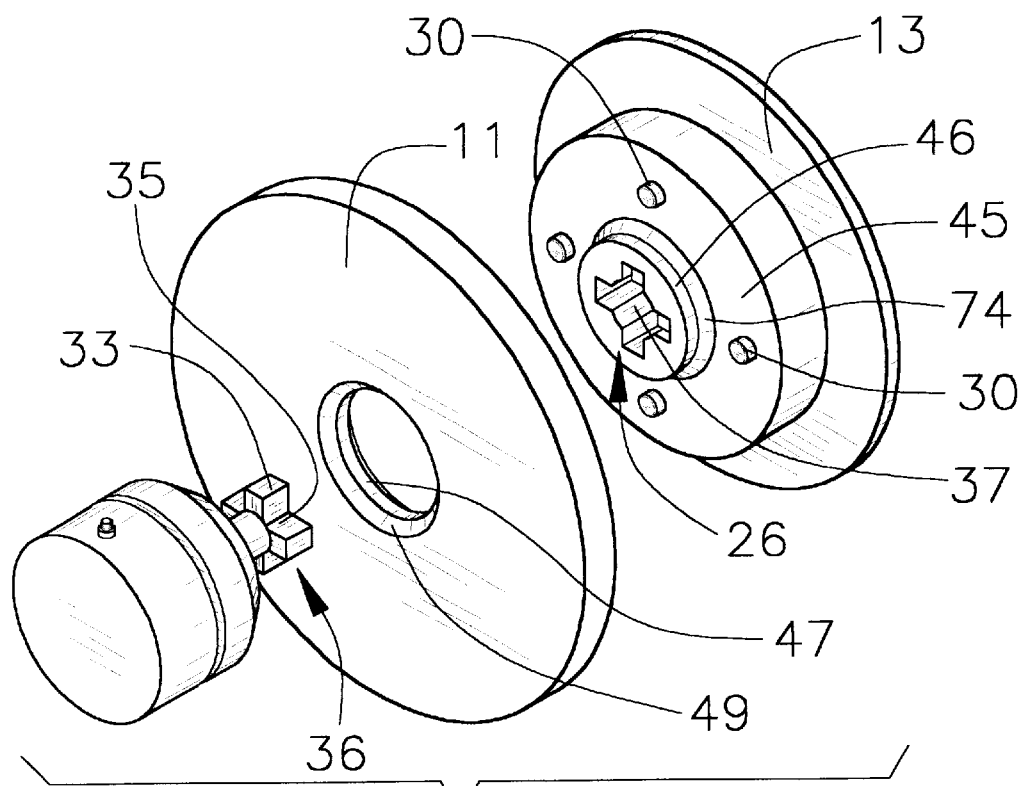
FIG. 6 is an exploded view of an alternate embodiment of the present invention.
Figure 7:
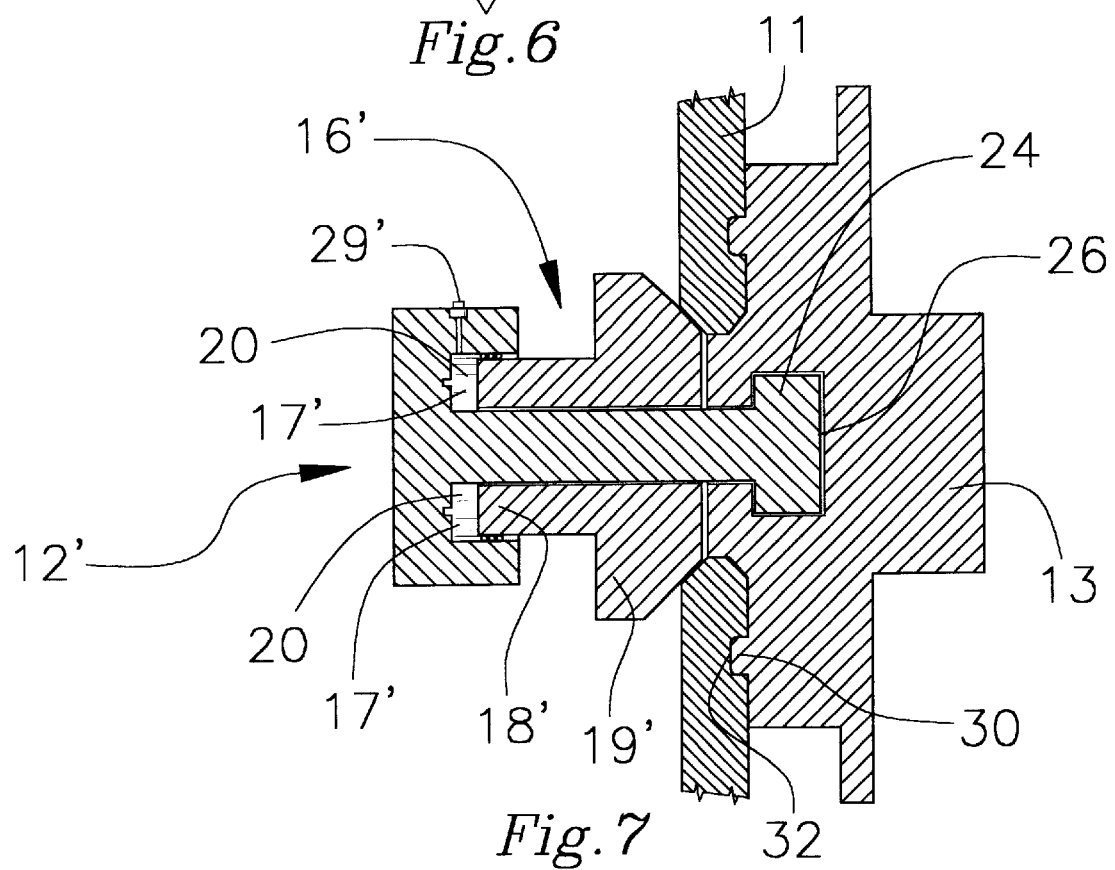
FIG. 7 is a cross-sectional view taken alone line 7—7 of FIG. 6.

A shown in FIGS. 6 and 7, a single plunger assembly 16' having an interior portion 18' and a head portion 19' may be positioned in interior space 17' of a hub assembly 12' without the need for piston 14. The structure of plunger assembly 16' is essentially equivalent to that of plunger assembly 16. Valve 29' leads directly into interior space 17' for permitting introduction and extraction of hydraulic fluid 20 for moving the plunger assembly 16'.

It is further contemplated that all structural components previously discussed and not directly related or required for use of the piston 14 and plunger assembly 16, may be employed for use in combination with the single plunger embodiment incorporating plunger assembly 16'. For example, frictional material disc 68 and cone washer 38 may both be utilized as described above in various embodiments with or without using piston 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle wheel attachment system comprising:

a hub having a hollow interior space;

a piston positioned within the interior space of the hub;

a hydraulic plunger assembly having an interior portion positioned in the interior space and a head portion extending outwardly from said hub;

a hydraulic fluid being positioned between the piston and the hydraulic plunger such that movement of the piston moves the hydraulic plunger assembly;

the hub having a main portion and an attachment portion, the attachment portion extending outwardly from the main portion;

a rotor having a receiving portion, the attachment portion of the hub being insertable into the receiving portion of the rotor for coupling the hub to the rotor;

a wheel having a central aperture, the attachment portion being insertable through the aperture such that the wheel is positioned between the hub and the rotor; and a valve in the hub for pressurizing said interior space of said hub proximate said piston whereby said piston urges said head portion of said plunger assembly outwardly from said hub to abut said wheel whereby said wheel is engaged to said rotor.

2. The vehicle wheel attachment system of claim 1, further comprising:

the rotor includes a plurality of spaced detents extending outwardly from the rotor;

the wheel having a plurality of spaced indents, each indent receiving an associated one of said spaced detents when said wheel is engaged to said rotor whereby said wheel is fixedly coupled relative to said rotor such that said wheel rotates with said rotor.

3. The vehicle wheel attachment system of claim 1, further comprising:

said attachment portion having a medial cylindrical portion and a distal bracket portion;

a cone washer coupled to said medial cylindrical portion of said attachment portion such that said cone washer is positioned between said head portion of said plunger and said rotor when said wheel is engaged to said rotor.

4. The vehicle wheel attachment system of claim 3, further comprising:

said bracket portion having a plurality of arms extending outwardly from a central portion of the bracket portion;

said receiving portion having a complimentary configuration whereby said bracket portion is insertable into said receiving portion; and wherein said bracket portion is rotatable within said receiving portion such that said arms abut an interior face of said rotor to prevent disengagement of said hub from said rotor.

5. The vehicle wheel attachment system of claim 1, further comprising:

a plurality of extension arms extending between and coupling together said interior portion and said head portion of said plunger assembly, each of said extension arms extending through an associated slot in said hub.

6. The vehicle wheel attachment system of claim 1, further comprising:

said rotor having a disc portion extending outwardly from an exterior face of said rotor;

said head portion of said plunger assembly having a beveled outer perimeter edge; and said aperture in said wheel having a cylindrical first portion for snugly receiving said disc portion of said rotor and a second angled portion extending from said first portion for snugly receiving said beveled outer perimeter edge of said head portion for facilitating firm engagement of said wheel to said rotor.

7. The vehicle wheel attachment system of claim 1, further comprising:

said head portion of said plunger assembly having a central aperture; and said attachment portion of said hub passing through said central opening in said head portion of said plunger assembly whereby said attachment portion of said hub and said plunger assembly are positioned coaxially with respect to each other.

8. The vehicle wheel attachment system of claim 1, further comprising:

said interior space of said hub having a medial throat portion for defining a first chamber and a second chamber in said interior space;

said piston having a cylinder and a rod extending outwardly from said cylinder, said cylinder being positioned in said first chamber and said rod extending into said throat portion of said interior space;

said hub having an air vent extending between an outer surface of said hub and said first chamber of said interior space proximate said rod such that said air vent is adapted for permitting environmental communication between outside air and said first chamber proximate said rod to permit free movement of said cylinder in said first chamber.

9. The vehicle wheel attachment system of claim 8, further comprising:

said rod having a locking groove, said locking groove extending around said rod perpendicular to a longitudinal axis of said rod; and said hub having a locking channel extending between said throat portion and said exterior surface of said hub, said locking channel being aligned with said locking groove when said interior space is pressurized to extended said plunger assembly whereby said hub couples said wheel to said rotor; and a locking member being insertable through said locking channel to engage said locking groove such that said piston is prevented from moving relative to said hub for preventing disengagement of said wheel from said rotor upon loss of pressure on said piston.

10. A vehicle wheel attachment system comprising:

a hub having a hollow interior space;

a piston positioned within the interior space of the hub;

a hydraulic plunger assembly having an interior portion positioned in the interior space and a head portion extending outwardly from said hub;

a hydraulic fluid being positioned between the piston and the hydraulic plunger such that movement of the piston moves the hydraulic plunger assembly;

the hub having a main portion and an attachment portion, the attachment portion extending outwardly from the main portion;

a rotor having a receiving portion, the attachment portion of the hub being insertable into the receiving portion of the rotor for coupling the hub to the rotor;

a wheel having a central aperture, the attachment portion being insertable through the aperture such that the wheel is positioned between the hub and the rotor;

a valve in the hub for pressurizing said interior space of said hub proximate said piston whereby said piston urges said head portion of said plunger assembly outwardly from said hub to abut said wheel whereby said wheel is engaged to said rotor;

the rotor includes a plurality of spaced detents extending outwardly from the rotor;

the wheel having a plurality of spaced indents, each indent receiving an associated one of said spaced detents when said wheel is engaged to said rotor whereby said wheel is fixedly coupled relative to said rotor such that said wheel rotates with said rotor;

said attachment portion having a medial cylindrical portion and a distal bracket portion;

a cone washer coupled to said medial cylindrical portion of said attachment portion such that said cone washer is positioned between said head portion of said plunger and said rotor when said wheel is engaged to said rotor;

said bracket portion having a plurality of arms extending outwardly from a central portion of the bracket portion, said receiving portion having a complimentary configuration whereby said bracket portion is insertable into said receiving portion;

wherein said bracket portion is rotatable within said receiving portion such that said arms abut an interior face of said rotor to prevent disengagement of said hub from said rotor;

a plurality of extension arms extending between and coupling together said interior portion and said head portion of said plunger assembly, each of said extension arms extending through an associated slot in said hub;

said rotor having a disc portion extending outwardly from an exterior face of said rotor;

said head portion of said plunger assembly having a beveled outer perimeter edge;

said aperture in said wheel having a cylindrical first portion for snugly receiving said disc portion of said rotor and an angled second portion extending from said first portion for snugly receiving said beveled outer perimeter edge of said head portion for facilitating firm engagement of said wheel to said rotor;

said aperture in said wheel having an angled third portion extending from said first portion opposite said second portion;

said rotor having an angled surface extending between said disc portion and said exterior face of said rotor, said angled third portion of said aperture in said wheel being for snugly receiving said angled surface of said rotor for facilitating firm engagement of said wheel to said rotor;

said head portion of said plunger assembly having a central aperture;

said attachment portion of said hub passing through said central opening in said head portion of said plunger assembly whereby said attachment portion of said hub and said plunger assembly are positioned coaxially with respect to each other;

said interior space of said hub having a medial throat portion for defining a first chamber and a second chamber in said interior space;

said piston having a cylinder and a rod extending outwardly from said cylinder, said cylinder being positioned in said first chamber and said rod extending into said throat portion of said interior space;

said hub having an air vent extending between an outer surface of said hub and said first chamber of said interior space proximate said rod such that said air vent is adapted for permitting environmental communication between outside air and said first chamber proximate said rod to permit free movement of said cylinder in said first chamber;

said rod having a locking groove, said locking groove extending around said rod perpendicular to a longitudinal axis of said rod;

said hub having a locking channel extending between said throat portion and said exterior surface of said hub, said locking channel being aligned with said locking groove when said interior space is pressurized to extended said plunger assembly whereby said hub couples said wheel to said rotor; and a locking member being insertable through said locking channel to engage said locking groove such that said piston is prevented from moving relative to said hub for preventing disengagement of said wheel from said rotor upon loss of pressure on said piston.

11. The vehicle wheel attachment system of claim 1, further comprising:

said rotor having a disc portion extending outwardly from an exterior face of said rotor;

said head portion of said plunger assembly having a beveled outer perimeter edge;

said aperture in said wheel having a cylindrical first portion for snugly receiving said disc portion of said rotor and an angled second portion extending from said first portion for snugly receiving said beveled outer perimeter edge of said head portion for facilitating firm engagement of said wheel to said rotor;

said aperture in said wheel having an angled third portion extending from said first portion opposite said second portion; and said rotor having an angled surface extending between said disc portion and said exterior face of said rotor, said angled third portion of said aperture in said wheel being for snugly receiving said angled surface of said rotor for facilitating firm engagement of said wheel to said rotor.

12. The vehicle wheel attachment system of claim 1, further comprising:

a frictional material being bonded to said rotor for frictionally engaging said wheel whereby said wheel is fixedly coupled relative to said rotor such that said wheel rotates with said rotor.

13. A vehicle wheel attachment system comprising:

a hub having a hollow interior space;

a hydraulic plunger assembly having an interior portion positioned in the interior space and a head portion extending outwardly from said hub;

a hydraulic fluid being insertable into said interior space such that modification of a volume of said hydraulic fluid in said interior space moves the hydraulic plunger assembly;

the hub having a main portion and an attachment portion, the attachment portion extending outwardly from the main portion;

a rotor having a receiving portion, the attachment portion of the hub being insertable into the receiving portion of the rotor for coupling the hub to the rotor;

a wheel having a central aperture, the attachment portion being insertable through the aperture such that the wheel is positioned between the hub and the rotor; and a valve in the hub extending into said interior space of said hub for facilitating selective modification of the volume of said hydraulic fluid in said interior space for moving said plunger assembly outwardly from said hub to abut said wheel whereby said wheel is engaged to said rotor.

14. The vehicle wheel attachment system of claim 13, further comprising:

said rotor including a plurality of spaced detents extending outwardly from the rotor;

said wheel having a plurality of spaced indents, each indent receiving an associated one of said spaced detents when said wheel is engaged to said rotor whereby said wheel is fixedly coupled relative to said rotor such that said wheel rotates with said rotor.

15. The vehicle wheel attachment system of claim 13, further comprising:

said attachment portion having a medial cylindrical portion and a distal bracket portion;

a cone washer coupled to said medial cylindrical portion of said attachment portion such that said cone washer is positioned between said head portion of said plunger and said rotor when said wheel is engaged to said rotor.

16. The vehicle wheel attachment system of claim 15, further comprising:

said bracket portion having a plurality of arms extending outwardly from a central portion of the bracket portion;

said receiving portion having a complimentary configuration whereby said bracket portion is insertable into said receiving portion; and wherein said bracket portion is rotatable within said receiving portion such that said arms abut an interior face of said rotor to prevent disengagement of said hub from said rotor.

17. The vehicle wheel attachment system of claim 13, further comprising:

a plurality of extension arms extending between and coupling together said interior portion and said head portion of said plunger assembly, each of said extension arms extending through an associated slot in said hub.

18. The vehicle wheel attachment system of claim 13, further comprising:

said rotor having a disc portion extending outwardly from an exterior face of said rotor;

said head portion of said plunger assembly having a beveled outer perimeter edge; and said aperture in said wheel having a cylindrical first portion for snugly receiving said disc portion of said rotor and a second angled portion extending from said first portion for snugly receiving said beveled outer perimeter edge of said head portion for facilitating firm engagement of said wheel to said rotor.

19. The vehicle wheel attachment system of claim 13, further comprising:

said head portion of said plunger assembly having a central aperture; and said attachment portion of said hub passing through said central opening in said head portion of said plunger assembly whereby said attachment portion of said hub and said plunger assembly are positioned coaxially with respect to each other.

20. The vehicle wheel attachment system of claim 13, further comprising:

said rotor having a disc portion extending outwardly from an exterior face of said rotor;

said head portion of said plunger assembly having a beveled outer perimeter edge;

said aperture in said wheel having a cylindrical first portion for snugly receiving said disc portion of said rotor and an angled second portion extending from said first portion for snugly receiving said beveled outer perimeter edge of said head portion for facilitating firm engagement of said wheel to said rotor;

said aperture in said wheel having an angled third portion extending from said first portion opposite said second portion; and said rotor having an angled surface extending between said disc portion and said exterior face of said rotor, said angled third portion of said aperture in said wheel being for snugly receiving said angled surface of said rotor for facilitating firm engagement of said wheel to said rotor.

* * * * *